June 6, 1961  N. L. ERICKSON ET AL  2,987,218
SAFETY PRESSURE RELIEF DEVICE
Filed March 26, 1958  2 Sheets-Sheet 1

NORRIS L. ERICKSON &
FRANKLIN A. HANSEN
INVENTORS

BY
ATTORNEY

June 6, 1961  N. L. ERICKSON ET AL  2,987,218
SAFETY PRESSURE RELIEF DEVICE

Filed March 26, 1958  2 Sheets-Sheet 2

NORRIS L. ERICKSON &
FRANK A. HANSEN
INVENTORS

BY Jack K. Springate

ATTORNEY

United States Patent Office 2,987,218
Patented June 6, 1961

2,987,218
SAFETY PRESSURE RELIEF DEVICE
Norris L. Erickson, Tulsa, Okla., and Franklin A. Hansen, Kansas City, Mo., assignors to Black, Sivalls & Bryson, Inc., Kansas City, Mo., a corporation of Delaware
Filed Mar. 26, 1958, Ser. No. 724,112
4 Claims. (Cl. 220—89)

The present invention relates generally to safety pressure relief devices and specifically to safety pressure relief devices of comparatively large diameter for the relief of moderately high pressures as hereinafter more fully explained.

The general trend of present day industries, e.g., the chemical industry, indicates that more processes are presently in use which utilize moderately high pressures and require a comparatively large safety pressure relief capacity to provide relief of large masses of fluids exposed to these pressures. For the purposes of the present invention moderately high pressures are meant pressures in the range from 20,000 pounds per square inch to 40,000 pounds per square inch. The relief area required at such pressures which would be considered comparatively large would be one having a diameter of one inch or larger. Processing systems operating at such pressures and requiring such comparatively large diameters dictate that the safety pressure relief device rupture to provide pressure relief at the precise desired rupture pressure and that the relief at such rupture pressure be through the complete relief area without any blocking of the area or other impedance to pressure relief. Further, safety pressure relief devices for such systems are required to be leak-proof at all pressures up to and including the predetermined rupture pressure.

Therefore, because of incomplete relieving capacity at desired relieving pressure and leakage spring loaded valves are not deemed suitable to provide pressure relief for such systems. Also, present types of rupturable diaphragm safety pressure relief devices have been found unsuitable because of leakage and fluctuation of the pressure at which these prior devices would rupture. Rupturable devices prior to the present invention are subject to leakage at such pressures. Efforts were made to increase the seating pre-load in such prior devices to eliminate the leakage and such pre-loading generally caused a premature failure of the device because pre-loading sufficient to prevent leakage would fail the rupture member on the line of seating contact. These failures generally occur at a pressure substantially below the desired rupture pressure. Further, such prior devices would also be subject to slipping of the flange portion of the rupture member into the relief area, thereby further complicating the maintenance of accuracy of the predetermined rupture pressure of the device.

Therefore, the primary object of the present invention is to provide a rupturable safety pressure relief device capable of adequately protecting systems from overpressure where such systems operate in a moderately high pressure range.

A further object of the present invention is to provide a safety pressure relief device requiring relatively light initial sealing loads to maintain a pressure seal under operating pressures in a moderately high pressure range. A still further object of the present invention is to provide a safety pressure relief device for pressure systems operating at moderately high pressures utilizing pressure sealing mechanisms to effect pressure sealing of the devices. Another object of the present invention is to provide a rupturable type safety pressure relief device having a strengthened flange portion to preserve the predetermined rupture pressure of the device.

In accomplishing these and other objects of the present invention, we have provided improved apparatus illustrated in the accompanying drawings wherein.

Figure 1:
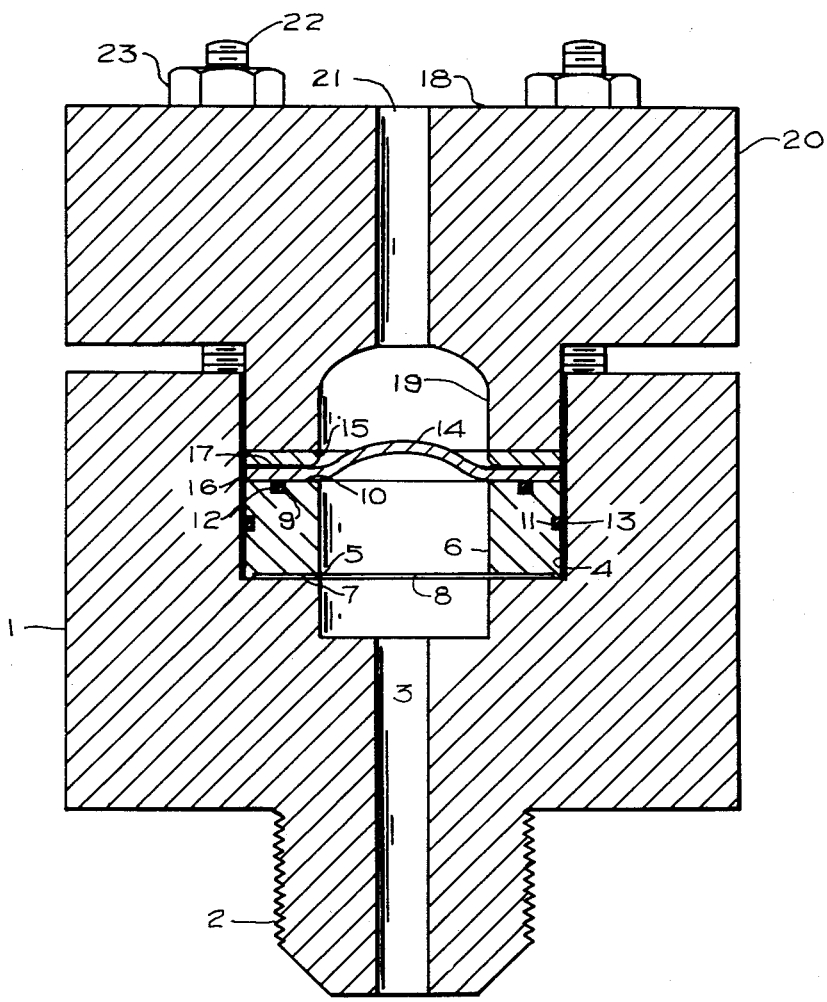
FIG. 1 is a sectional view of a safety pressure relief device constructed to embody the novel features of the present invention.

Referring more in detail to FIG. 1, body member 1 is designed to be connected into a pressure system operating at a moderately high pressure. Nipple 2 is made an integral part of body member 1 having relief passageway 3 extending into body member 1 and being threaded to facilitate connection into such pressure system. The interior of body member 1 has a bore 4 which terminates on shoulder 5. Piston 6 is positioned in bore 4 on shoulder 5. The lower surface 7 of piston 6 is machined to form space 8 to assure that pressure will be exerted on surface 7. Piston 6 is annular in configuration and has annular groove 9 in its upper surface 10 and groove 11 around its outer periphery. O rings 12 and 13 are positioned in grooves 9 and 11 respectively.

Rupturable diaphragm 14, when in operational position, is held on the upper surface 10 of piston 6 in covering relationship to groove 9. Reinforcing ring 15 is secured to the upper surface of flange 16 of diaphragm 14 by silver solder or other suitable securing means as indicated at 17.

Holddown member 18 comprises internal hub 19 and flange 20 with relief passageway 21 extending through member 18. Flange 20 of holddown member 18 is drilled to receive studs 22. Body member 1 is drilled and tapped to receive studs 22. Nuts 23 are tightened on studs 22 to secure holddown member 18 to body member 1 and to provide the initial pressure sealing of the unit.

Figure 2:
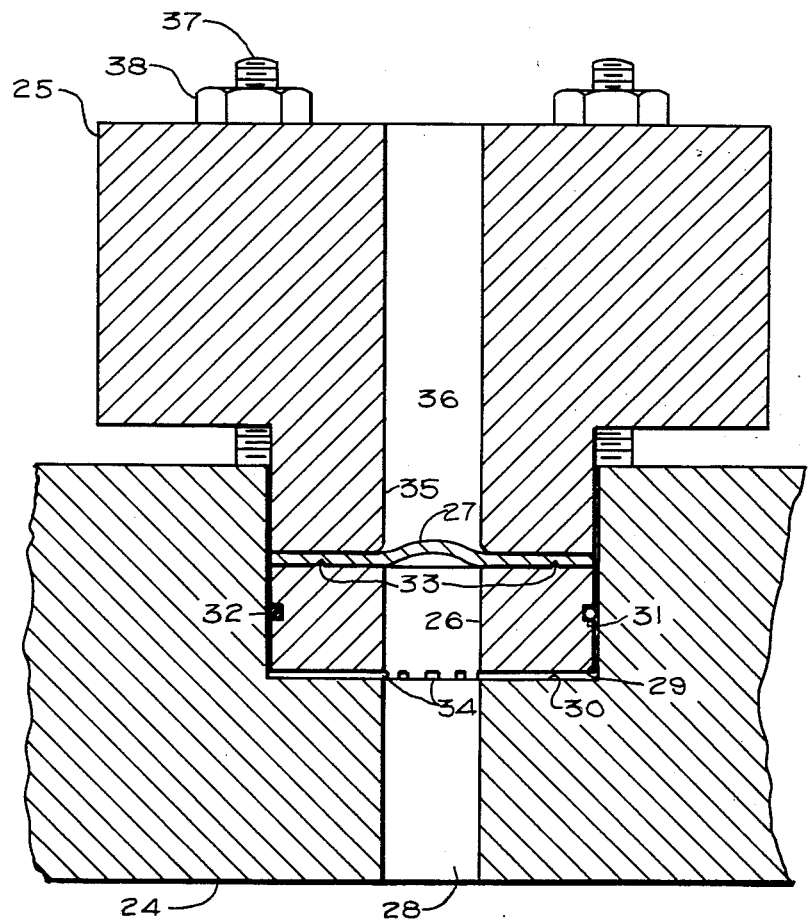
FIG. 2 is a sectional view of a modified form of the safety pressure relief device of the present invention.

The sectional view of the modified form of the present invention illustrated in FIG. 2 comprises vessel wall 24, holddown member 25, piston 26 and rupturable diaphragm 27. Vessel wall 24 is prepared to have relief passageway 28 extending through to its interior side and communicating with bore 29. Vessel wall 24, being formed as described and shown in FIG. 2 to receive holddown member 25, piston 26 and rupturable diaphragm 27, will eliminate the necessity of using a body member similar to body member 1 as illustrated in FIG. 1. Bore 29 terminates at shoulder 30 and has piston 26 positioned therein against shoulder 30. Groove 31 extends around the central portion of the outer peripheral surface of piston 26 to accommodate O ring 32. The surface of piston 26 resting on shoulder 30 is formed to have a plurality of radial grooves 34. Diaphragm 27 rests on piston 26 as shown in FIG. 2, engaging knife edge 33. Knife edge 33 extends from the upper surface of piston 26 to engage the lower surface of rupturable diaphragm 27.

Holddown member 25 is positioned to have its hub 35 within bore 29 resting on the upper outer flange surface of rupturable diaphragm 27. Relief passageway 36 extends through holddown member 25. Holddown member 25 is secured to vessel wall 24 by studs 37 and nuts 38.

In operation the device of the present invention illustrated in FIG. 1 is secured into a pressure vessel to be protected (not shown) by threading nipple 2 into a similarly threaded hole in the pressure vessel. Piston 6 and rupturable diaphragm 14 are inserted into bore 4 as shown and holddown member 18 tightened into position on reinforcing ring 15 of rupturable diaphragm 14. With O rings 12 and 13 properly positioned in grooves 9 and 11 initial sealing of piston 6 and rupturable diaphragm 14 will be accomplished with a minimum tightening of holddown member 18. When first exposed to pressure, O rings 12 and 13 will retain the pressures and as additional increase in pressure builds up, pressure will be exerted in space 8 under piston 6 causing piston 6 to be held tightly in engagement with rupturable diaphragm 14. Thus, piston 6 is energized by the system pressure to maintain the pressure seal of the unit.

Also, reinforcing ring 15 being secured on flange 16 of rupturable diaphragm 14 will prevent rupturable diaphragm 14 from pulling away from its seated position thereby maintaining the predetermined rupture pressure of rupturable diaphragm 14. When the pressure in the system being protected reaches the predetermined rupture pressure of rupturable diaphragm 14, it will rupture causing the system pressure to be relieved through relief passageway 3, the opening through piston 6 and out relief passageway 21. It should be noted that in many applications, particularly where the device of the present invention is protecting a system containing toxic fumes, that the relief of such fumes through passageway 21 should be conducted to a suitable safe place for discharge.

The device of FIG. 2 operates in a similar manner with the exception that rupturable diaphragm 27 is maintained in its seated position under pressures by engagement with knife edge 33 on piston 26. This maintenance of the seated position of rupturable diaphragm 27 is also aided by constructing rupturable diaphragm 27 to have an outer diameter larger than is normally necessary in low pressure applications. For example, a normal diaphragm having a relief diameter of one inch would have an outer diameter of approximately one and three-eighths inches. A similar diaphragm constructed in accordance with the form of the present invention illustrated as rupturable diaphragm 27 in FIG. 2 would have an outer diameter of at least two inches. When installed, the unit of FIG. 2 will be exposed to pressures on the interior of vessel wall 24. Pressure will be sealed by O ring 32 and knife edge 33. Also, pressure will be admitted into radial grooves 34 causing piston 26 to be actuated and maintain its seating contact with rupturable diaphragm 27. Upon rupture of rupturable diapragm 27 pressure will be relieved through relief passageway 28, the interior passage through piston 26 and relief passageway 36.

In both forms of the present invention even though the pressures to which the devices are exposed might be sufficient to elongate the studs retaining the holddown members, the pistons will be pressure actuated to maintain a pressure seal for all pressures up to the rupture pressure of the rupturable diaphragm installed in the device. Further, each form of the present invention has provided means for preventing the slippage of the rupturable diaphragm from its seated position into the relief passageway thereby preserving its predetermined rupture pressure within the tolerances normally allowed for such devices.

We have provided a safety pressure relief device for protection of systems operating at a moderately high pressure. The present invention further makes provision for a pressure actuated sealing of the unit and for the retention of the rupturable diaphragm in its seated position at all pressures to which it is to be exposed.

What we claim and desire to secure by Letters Patent is:

1. A safety pressure relief device comprising, a rupturable diaphragm mounted in a relief passageway, said diaphragm having an outer flange portion and a central rupture portion, a piston engaging the pressure side of said flange portion of said diaphragm, said piston being annular in shape to provide a passageway for communication of fluid pressure to said central rupture portion of said diaphragm, first sealing means in the outer cylindrical surface of said piston, a knife edge on the end surface of said piston engaging the pressure side of the flange portion of said diaphragm, the height of said knife edge being sufficiently small in comparison to the thickness of said flange portion of said diaphragm to deform only the pressure side of said flange portion of said diaphragm while providing a pressure seal between said piston and said flange portion of said diaphragm and providing retention of the flange portion of said diaphragm, and a holddown member engaging the side of said flange portion opposite the pressure side of said flange portion of said diaphragm to retain said diaphragm in said relief passageway.

2. A safety pressure relief device comprising a rupturable diaphragm mounted in a relief passageway, said diaphragm having an outer flange portion and a central rupture portion, an annular piston having one end thereof engaging the pressure side of said flange portion, the other end of said piston being exposed to the pressure being contained by said diaphragm, pressure-tightenable deformable sealing means between the cylindrical exterior of said piston and the interior cylindrical surface of a surrounding enclosing member, means for maintaining a major portion of the surface of said piston other end spaced from the opposed surface of said enclosing member, whereby the pressure being contained can act on said major portion, means forming an annular seal between said one end of said piston and said flange portion, an annular hold-down member engaging the other side of said flange portion, and means engaging said members for drawing them toward each other to clamp said flange portion between said hold-down member and said piston.

3. The structure defined in claim 2 in which the seal between the one end of the piston and the flange portion comprises an O-ring disposed in an annular groove in said one end of said piston.

4. The structure defined in claim 2 in which the seal between the one end of the piston and the flange portion comprises an annular knife edge on said one end of a height less than the thickness of said flange portion and opposed to a flat surface on the hold-down member.

References Cited in the file of this patent

UNITED STATES PATENTS

| | | |
|---|---|---|
| 138,171 | Matthews | Apr. 22, 1873 |
| 328,008 | Conner et al. | Oct. 13, 1885 |
| 1,093,254 | Clarke | Apr. 14, 1914 |
| 2,130,763 | Bouillon | Sept. 20, 1938 |
| 2,224,748 | Sauer | Dec. 10, 1940 |
| 2,437,836 | Santiago | Mar. 16, 1948 |
| 2,526,794 | Andrews | Oct. 24, 1950 |
| 2,589,144 | Russell | Mar. 11, 1952 |
| 2,630,939 | Jones | Mar. 10, 1953 |
| 2,661,121 | Coffman et al. | Dec. 1, 1953 |
| 2,692,066 | Conrad | Oct. 19, 1954 |
| 2,758,749 | Jones | Aug. 14, 1956 |
| 2,772,019 | Jones | Nov. 27, 1956 |
| 2,856,096 | Philip | Oct. 14, 1958 |
| 2,922,544 | Hibbard et al. | Jan. 26, 1960 |

FOREIGN PATENTS

| | | |
|---|---|---|
| 957,849 | France | Aug. 29, 1949 |